United States Patent Office 2,909,366
Patented Oct. 20, 1959

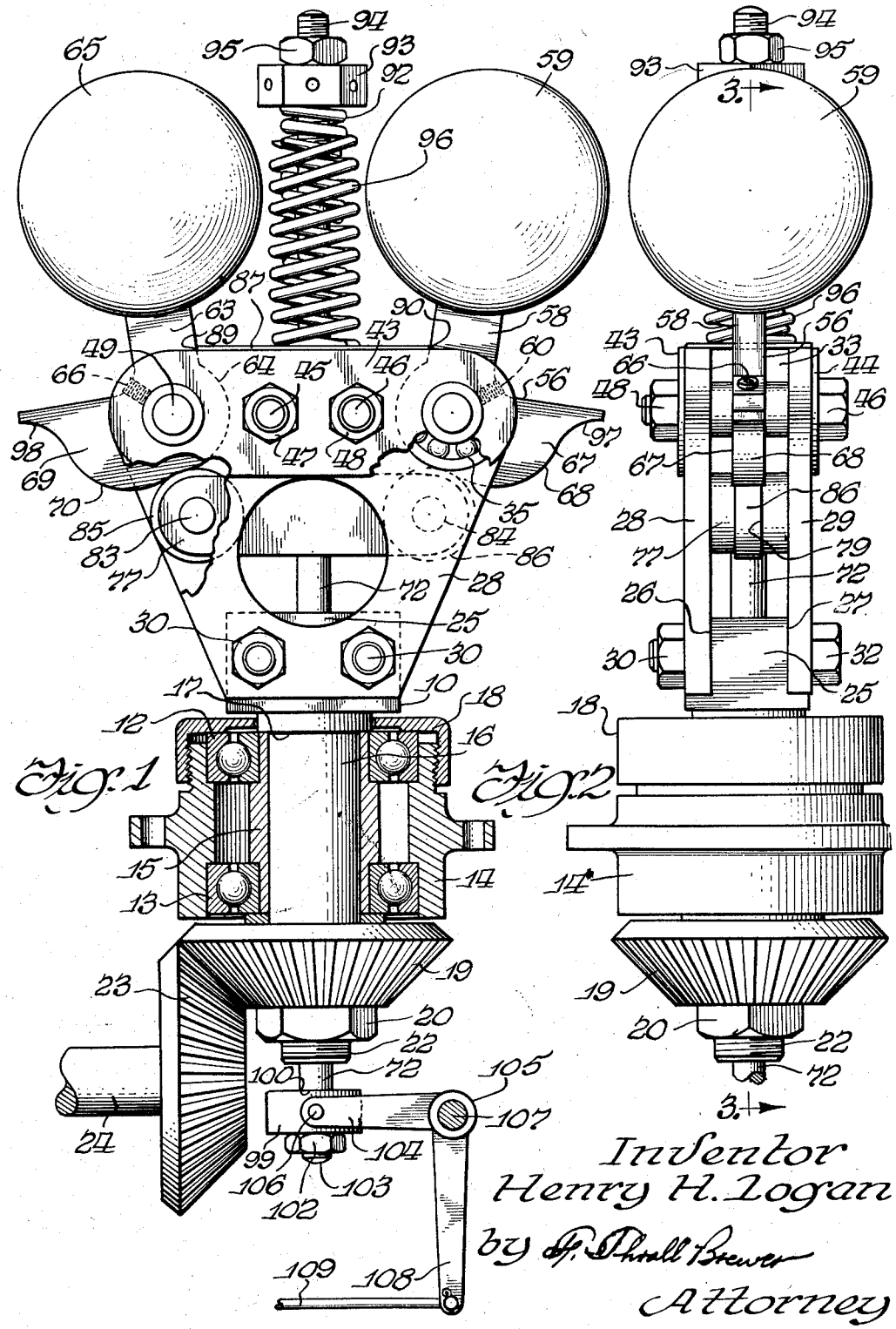

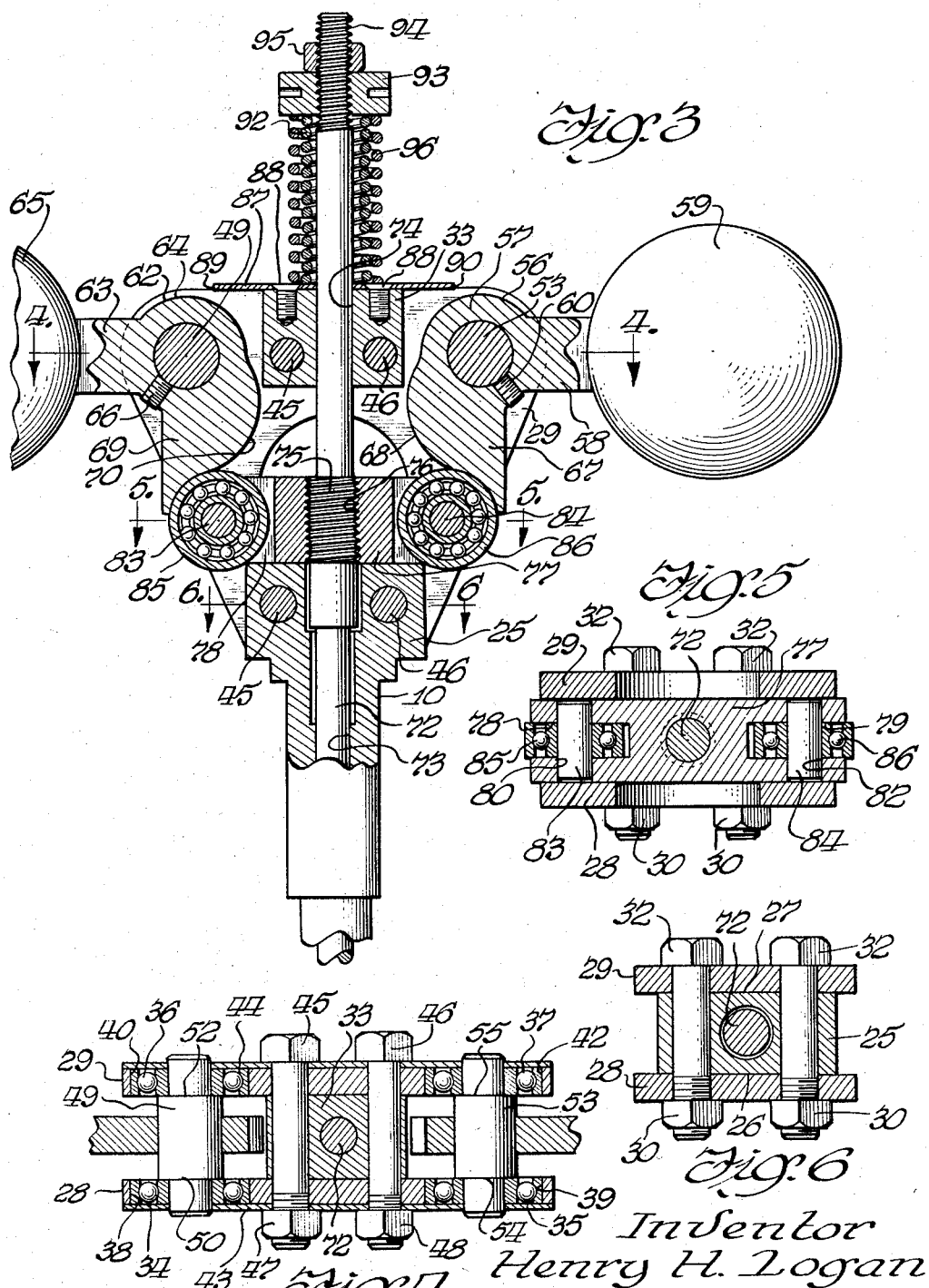

2,909,366

GOVERNORS

Henry H. Logan, Chicago, Ill.

Application June 7, 1955, Serial No. 513,660

1 Claim. (Cl. 264—15)

This invention relates to governors, and more particularly to speed responsive mechanical governors.

One of the more general objects of my invention is to provide a speed responsive mechanical governor which is not only sensitive to speed variations at relatively low speeds, but which remains active and sensitive to speed variations within a wide range of speeds.

For effecting the accomplishment of the foregoing general object, I have conceived and developed a governor structure wherein the parts are constructed, arranged and combined to provide:

(a) A mechanical governor wherein gravitational forces aid, rather than resist, response to speed variations at low speeds.

(b) A governor structure wherein the sensitivity to speed response at various speeds is subject to preselection generally by predetermination of part designs and more exactly by adjustments or changes of variable operating parts.

(c) A mechanical speed responsive governor wherein the highest speed at which the mechanism can respond to speed variations is a comparatively large multiple of the speed at which the mechanism starts to be effectively responsive to speed variations.

As another object, my invention has within its purview the provision of a mechanical speed responsive governor having parts constructed and related to assume and maintain definite positions when operating at uniform speeds.

My invention further comprehends the provision of a mechanical speed responsive governor wherein frictional resistance to movements of the operating parts is minimized and in which cams are utilized to translate movements of the speed responsive parts, which cams have profiles developed to afford desired speed response characteristics.

As another object, the invention contemplates the provision of a speed responsive mechanical governor utilizing a plurality of resilient elements which are sequentially effective for controlling movements of the speed responsive parts in various speed ranges.

These and other objects of this invention will become apparent from the following detailed description thereof when taken together with the accompanying drawings in which:

Fig. 1 is a front elevational view of a governor embodying a preferred form of my invention and includes parts to indicate the support for the governor and connections to driving and controlled instrumentalities;

Fig. 2 is a side elevational view of the structure depicted in Fig. 1;

Fig. 3 is a fragmentary front sectional view of the governor structure, wherein the section is taken substantially on a line 3—3 of Fig. 2 and in the direction of the accompanying arrows; and Figs. 4, 5 and 6 are each top sectional views taken respectively at substantially the positions of the lines 4—4, 5—5, and 6—6 in Fig. 3 and as indicated by arrows.

In the exemplary embodiment of my invention which is depicted in the accompanying drawings for illustrative purposes, my speed responsive mechanical governor mechanism has a stem 10 which serves as a part of the governor supporting structure and which, in use, is supported for rotational movement by means such as the disclosed anti-friction bearings 12 and 13, which bearings are supported in spaced relationship in a flanged bearing supporting collar 14. Adjacent the stem 10, the inner races of the bearings 12 and 13 also engage an inner spacing collar 15 which fits onto a cylindrical portion 16 of the stem 10 and abuts a shoulder 17 at the upper end of the stem. In the disclosed structure a cap 18 is threaded onto the upper end of the bearing supporting collar 14 and extends inwardly to a position adjacent the upper portion of the stem.

In the illustrated embodiment, the governor is adapted to be driven by means such as a bevel gear 19 secured to the lower end of the stem 10 by fastening means such as a nut 20 on a threaded end portion 22. The bevel gear 19 meshes with a second bevel gear 23 which is driven from a source of motivation through a shaft 24.

At its upper end, the stem 10 has a cross block 25 which is of generally rectangular shape and is integral with the lower portion of the stem. This cross block 25 has substantially parallel side faces 26 and 27 in spaced and opposed relationship to one another which serve as mounting faces for the support of side plates 28 and 29 which extend therefrom in spaced and opposed relationship and constitute parts of a supporting structure for moving elements of the governor mechanism. As disclosed, the side plates 28 and 29 are secured against the opposite side faces 26 and 27 of the cross block 25 by fastening means such as bolts 32 and nuts 30. At the mid-portion of the upper ends of the side plates 28 and 29, a head block 33 is mounted between the plates to securely hold them in spaced and substantially parallel relationship.

Also at the upper ends of the side plates 28 and 29 and at positions spaced substantially equidistantly on opposite sides of the axis of the stem 10, about which the governor is adapted to rotate, and as illustrated in Figs. 1 and 4, anti-friction bearings 34, 35, 36 and 37 are mounted in openings 38, 39, 40 and 42 respectively in the side plates with the outer races of those bearings fitting into the respective openings. The openings 38 and 39 are at positions on opposite sides of the plate 28 and have the bearings 34 and 35 mounted therein while the bearings 36 and 37 are mounted in the openings 40 and 42 on opposite sides of the side plate 29. In their assembled relationship, the bearings 34 and 36 are in spaced, opposed and axially aligned relationship, and the bearings 35 and 37 are similarly related to one another.

Bearing retaining plates 43 and 44 extend across the upper portions of the outer surfaces of the side plates 28 and 29 respectively and overlie the bearings 34, 35, 36 and 37 which are carried by the respective side plates to hold those bearings in place at the external surfaces of the side plates. The bearing retaining plates 43 and 44 and the head block 33 are secured in place relative to the side plates 28 and 29 by fastening means such as fitted bolts 45 and 46 which extend therethrough and are provided with nuts 47 and 48.

A shouldered cross pin 49 is supported for rotational movement by the axially aligned anti-friction bearings 34 and 36 and has shoulders 50 and 52 thereon which engage the opposed inner surfaces of the inner races of those bearings to hold the bearings in place relative to the side plates internally of the structure. Likewise, the shouldered cross pin 53 is supported for rotation by the axially aligned anti-friction bearings 35 and 37 and has shoulders 54 and 55 which engage the inner ends of the inner races of those bearings to hold them in place internally of the structure and relative to the side plates 28 and 29.

A flyball structure 56, including a hub portion 57 having an arm 58 projecting therefrom with a ball type weight 59 secured thereto remote from the hub 57, is secured to the mid-portion of the shouldered cross pin 53 by fastening means such as a set screw 60. Similarly, a flyball structure 62, having an arm 63 extending outwardly from a hub portion 64 with a ball-type weight 65 on its outer end, is secured to the mid-portion of the shouldered cross pin 49 by fastening means such as a set screw 66. The flyball structure 56 also includes a cam portion 67 which projects outwardly from the hub portion 57 in angular relationship to the arm 58 and has thereon a contoured cam surface 68. Likewise, the flyball structure 62 has thereon a cam portion 69 which projects from the hub portion 62 in angular relationship to the arm 63 and has thereon a contoured cam surface 70 which corresponds in shape to the contoured cam surface 68.

A spindle 72 extends axially through the stem 10 and the cross block 25 at the upper end of the stem, and is journaled for axial movement in an internal bearing surface 73 in the lower end of the stem, as well as being journaled at its upper end in a supporting bearing opening 74 in the head block 33. At its mid-portion the spindle 72 has a threaded portion 75 which is normally disposed at a position between the mid-portions of the side plates 28 and 29, which threaded portion is threaded into a bore 76 in the mid-portion of a cross head 77. The cross head 77 is freely movable between the side plates 28 and 29 and extends equidistantly on opposite sides of the axis of the spindle 72. Opposite ends of the cross head 77, as shown in Figs. 3 and 5, have longitudinally extending slots 78 and 79 therein and are provided with lateral bores 80 and 82, the axes of which bores extend across the slots 78 and 79 respectively and are spaced equidistantly on opposite sides of the axis of the spindle 72. Cross pins 83 and 84 which are mounted in the bores 80 and 82 respectively support anti-friction bearings 85 and 86 in the slots 78 and 79 respectively, the outer races of which bearings project beyond the ends of the cross head 77 and serve as cam followers for engagement with the cam surfaces 70 and 68 respectively on the flyball structures 62 and 56 respectively. The cross pins 83 and 84 are retained in the bores 80 and 82 by the side plates 28 and 29.

A stop plate 87 is secured to the top surface of the head block 33 by fastening means such as screws 88 and has end surfaces 89 and 90 which are aligned for engagement with the arms 63 and 58 respectively of the flyball structures to limit the movements of the flyball structures toward a retracted position in which the arms extend upwardly on opposite sides of the upper end of the spindle 72, as shown in Fig. 1. As herein disclosed, and by preference, the axes of arms 58 and 63 of the flyball structures diverge upwardly from one another when the arms and flyballs are in their retracted positions so that in their normal positions of rest, the arms are each at an angle of from five degrees to fifteen degrees to the axis of the spindle 72. Since the arms 58 and 63 and the flyballs 59 and 65 which are carried thereby normally extend upwardly from the axes of the cross pins 53 and 49 by which they are supported for swinging movement, gravitational forces act to aid centrifugal force in producing movement of the flyballs which are proportional to the speed of rotation of the governor as it is turned relative to the axis of the stem 10. Also, since the axes of the arms 63 and 58 of the flyball structures diverge upwardly, gravitational force has a component which aids in overcoming friction and initiating movements of the flyballs at low speeds. It has been found that an outward divergence of each flyball arm from the axis of rotation of the flyball structure of between 5° and 15° in the disclosed structure places some initial stress on the spring 92 without having it hold the flyball arms away from their stops, and provides a component of gravitational force which is active at the start of operation and at low speeds to compensate for frictional forces in the governor structure which, at the start and at low speeds, would otherwise be detrimental to sensitivity.

A coiled compression spring 92 encompasses and extends along the upper portion of the spindle 72 with one end resting against the upper surface of the stop plate 87 and its other end engaged by a nut 93 on a threaded end portion 94 of the spindle. A lock nut 95 which is also threaded onto the end portion 94 of the spindle serves to hold the nut 93 in an adjusted position in which the compression spring 92 exerts a required and desired amount of upward force to and through the stem 72. This force exerted through the stem 72 biases the cross head 77 upwardly and holds the cam following surfaces of the bearings 85 and 86 in contact with the cam surfaces 70 and 68 respectively. The contours of the cam surfaces 68 and 70 are such that the upward forces of the cam following surfaces thereagainst bias the flyball structures 56 and 62 to their normal retracted positions and overcome normal frictional and gravitational forces upon the flyball structures, as well as resisting initial movements of the flyballs which are effected by centrifugal force. In order to make the disclosed governor mechanism sensitive to low speeds, the initial pressures of the arms 58 and 63 against the end surfaces 90 and 89 of the stop plate 87 which are effected by the action of the spring 92 are quite light.

In order to increase the range of speeds over which the disclosed governor mechanism is effective for providing control, I have added a second compression spring 96 which encompasses the lower portion of the spring 92 and also has one end resting against the top surface of the stop plate 87. This second compression spring is wound in the opposite direction from the spring 92, so that the turns of the two springs do not become interlocked, and is of a size such that both springs work freely, one within the other, for exerting force against the nut 93 and through the spindle 72. The second spring 96, however, is shorter than the adjusted length of the spring 92, so that it does not normally engage the end surface of the nut 93. Thus, the spring 92 is the only one that is initially effective, and the second spring 96 becomes effective in the sequence of operation after the flyballs have moved outwardly from their normal positions by a predetermined amount. With this structure, it may be readily understood that initial movements of the flyballs are resisted only by the spring 92 acting through the stem 72, the cross head 77, the cam follower surfaces of the bearings 85 and 86 and the cam surfaces 70 and 68. The second spring becomes effective at a position dependent upon its length to resist the gravitational and centrifugal forces after a predetermined initial speed of governor operation has been reached.

In the disclosed structure, it may be readily understood that in addition to the controlled speed range increase which results from the sequential utilization and operation of the springs 92 and 96, the contours of the cam surfaces 68 and 70 are also adapted to preselection or predetermination to establish and define the spring forces which are effective through their action for resisting the centrifugal and gravitational forces acting upon the flyballs. It is presumed that for normal use and for effecting corresponding movements of the flyballs in response to predetermined speeds, the contours of the cam surfaces 68 and 70 are and shall be similar. In my disclosed structure, the curvatures of the cam surfaces, in addition to being similar, are such that the leverage through which the spring forces act against movements of the flyballs increases as the flyballs move outwardly. This further tends to increase the range of speeds controllable by the governor without interfering with the sensitivity of response at low speeds. At the outer ends of the cam surfaces 68 and 70, I have provided portions 97 and 98 which are reversely curved with respect to the adjoining cam surface portions and which fit the cam follower surfaces of the bearings 85 and 86 to serve as stops for limiting and stabilizing the positions of the flyballs when the maximum controllable speed of the governor is reached.

The axial linear movements of the stem 72 which are effected by balance of the forces of the spring 92 or springs 92 and 96 acting through the cams and cam followers against the gravitational and centrifugal forces which act upon the flyballs 59 and 65 are utilized for effecting the speed responsive control for which the governor is utilized. To indicate one manner of accomplishing this result, the disclosed structure has an antifriction bearing 99 mounted on the lower end of the spindle 72 which projects through the threaded end portion 22 of the stem and is held against a shoulder 100 on the spindle by fastening means such as a nut 102 threaded onto an end portion 103 at the lower end of the spindle. A yoke 104 which constitutes an arm of a bellcrank 105 is movably connected to the outer race of the bearing 99 through fastening means such as a pin 106. The bellcrank 105 is supported for swinging movement by a shaft 107 and has another arm 108 which may be connected through means such as a rod 109 to any instrumentality which is to be responsive to the governor operation and controlled thereby.

From the foregoing description and reference to the accompanying drawings, it may be readily understood that I have provided a governor having many features of construction and arrangement which contribute to sensitive and effective governor control over a wide range of speeds and which affords sensitivity, when desired, for controlling even very low speeds of operation. Factors which contribute to the sensitivity and to the wide range of speed control include the utilization of gravitational forces to assist, rather than resist, the centrifugal forces which effect movements of the flyball structures. In addition, I have utilized springs which are sequentially effective for resisting movements of the flyball structures effected by gravitational and centrifugal forces, and have interposed cams and cam followers between the flyball structures and the spindle upon which the springs act, which cams are subject to preselection for predetermination of the effective spring forces at various positions of the flyball structures.

It is understood that the foregoing description is merely illustrative of a preferred embodiment of this invention and that the scope of this invention, therefore, is not to be limited thereto, but is to be determined by the appended claim.

I claim:

A speed responsive mechanical governor comprising, in combination, supporting structure including a stem having an axis with reference to which the governor is rotated in use, a head assembly secured to one end of the stem and including two side plates in spaced and opposed relationship to one another, a spindle journalled for axial movement relative to the stem and extending through the mid-portion of the head assembly between the side plates thereof, a cross head secured to the spindle between said side plates and movable linearly with the spindle, said cross head having means providing cam follower surfaces at its opposite ends, arms extending upwardly from the side plates and supporting flyballs at their upper ends, said arms being supported between the side plates for swinging movements in a plane passing through the axis of the spindle and having cam portions secured thereto and projecting therefrom at positions spaced from the flyballs and engaging the cam follower surfaces on the cross head, said arms each diverging outwardly toward their upper ends from the axis of the stem at an angle of between 5° and 15° to provide gravitational force components acting on the flyballs to overcome frictional resistance to movements of the flyballs, spring means for biasing the spindle and cross head in one direction axially of the spindle and to normal positions such that the flyballs are swung to retracted positions by the action of the cam follower surfaces against the cam portions, said spring means comprising a plurality of springs, one of which is continually effective, and a second of which is effective only after predetermined movements of the flyballs from their normal positions against the action of said one of the springs, and said cam portions having reversely curved cam surface portions to effect movements of the spindle and cross head against the biasing force of said spring means and to effect increased resistance to such movements of the spindle and cross head as the flyballs swing away from said retracted positions by centrifugal force when the stem and head assembly are rotated about the axis of the stem.

References Cited in the file of this patent

UNITED STATES PATENTS

| 443,064 | Barrett et al. | Dec. 16, 1890 |
| 941,775 | Haeberlein | Nov. 30, 1909 |
| 1,104,704 | Picken | July 21, 1914 |
| 2,247,492 | Hale | July 1, 1941 |
| 2,281,222 | Baierlein | Apr. 28, 1942 |
| 2,533,564 | Dwelle | Dec. 12, 1950 |

FOREIGN PATENTS

| 186,517 | Germany | Oct. 6, 1905 |
| 2,227 | Great Britain | Jan. 30, 1896 |
| 189,413 | Great Britain | Apr. 22, 1922 |